United States Patent

[11] 3,554,143

[72] Inventors Elbert A. Rodgers
    4520 Spencer Drive, Wichita Falls, 76308;
    Thornton C. Huddle, D-406 Petroleum
    Center Bldg., San Antonio, 78209; Kent B.
    Knox, D-406 Petroleum Center Bldg., San
    Antonio, Tex. 78209
[21] Appl. No. 788,708
[22] Filed Jan. 3, 1969
[45] Patented Jan. 12, 1971

[54] METHOD OF AND APPARATUS FOR
    THERMOLYTIC DESTRUCTIVE DISTILLATION
    OF CARBONACEOUS MATERIALS, INCLUDING
    THE RECOVERY OF CERTAIN PRODUCTS
    THEREFROM
    16 Claims, 19 Drawing Figs.

[52] U.S. Cl. .................................................. 110/10,
                                                          110/15
[51] Int. Cl. .................................................. F23g 5/00
[50] Field of Search .......................... 122/2; 110/7, 8, 10, 15

[56]            References Cited
         UNITED STATES PATENTS
2,171,535  9/1939  Berg et al. ................... 110/8X
2,479,818  8/1949  Decarie ....................... 110/15
3,046,915  7/1962  Ludin .......................... 110/15
3,403,643  10/1968 Denig .......................... 110/15X Primary Examiner—Kenneth W. Sprague
Attorney—Wayland D. Keith ABSTRACT: A system for treating carbonaceous material, particularly garbage and refuse by destructive distillation to reduce the material to ash, in an expeditious manner, while recovering usable byproducts therefrom, such as gas, tars, oils, greases, acids, and fly ash, and destructively burning the odoriferous gases and other pollutants present in the garbage and refuse, and progressively and continuously moving the material through a plurality of heating chambers in the system, in batches, and utilizing the processing heat, which would normally be discharged to atmosphere from the stack, to dry and heat incoming refuse and garbage in heat exchange relation so as to consume a minimum of fuel for the maximum amount of refuse and garbage processed, and producing some or most of the fuel gas required in operating the system, or even more than the fuel requirement. Further, the spent flue gases are utilized to heat water in heat exchange relation to produce steam. Inasmuch as no odor is given off by the system, and due to the fact that only a small amount of land space is required for installation, the system can be installed in populated areas, close to the source of refuse and garbage.

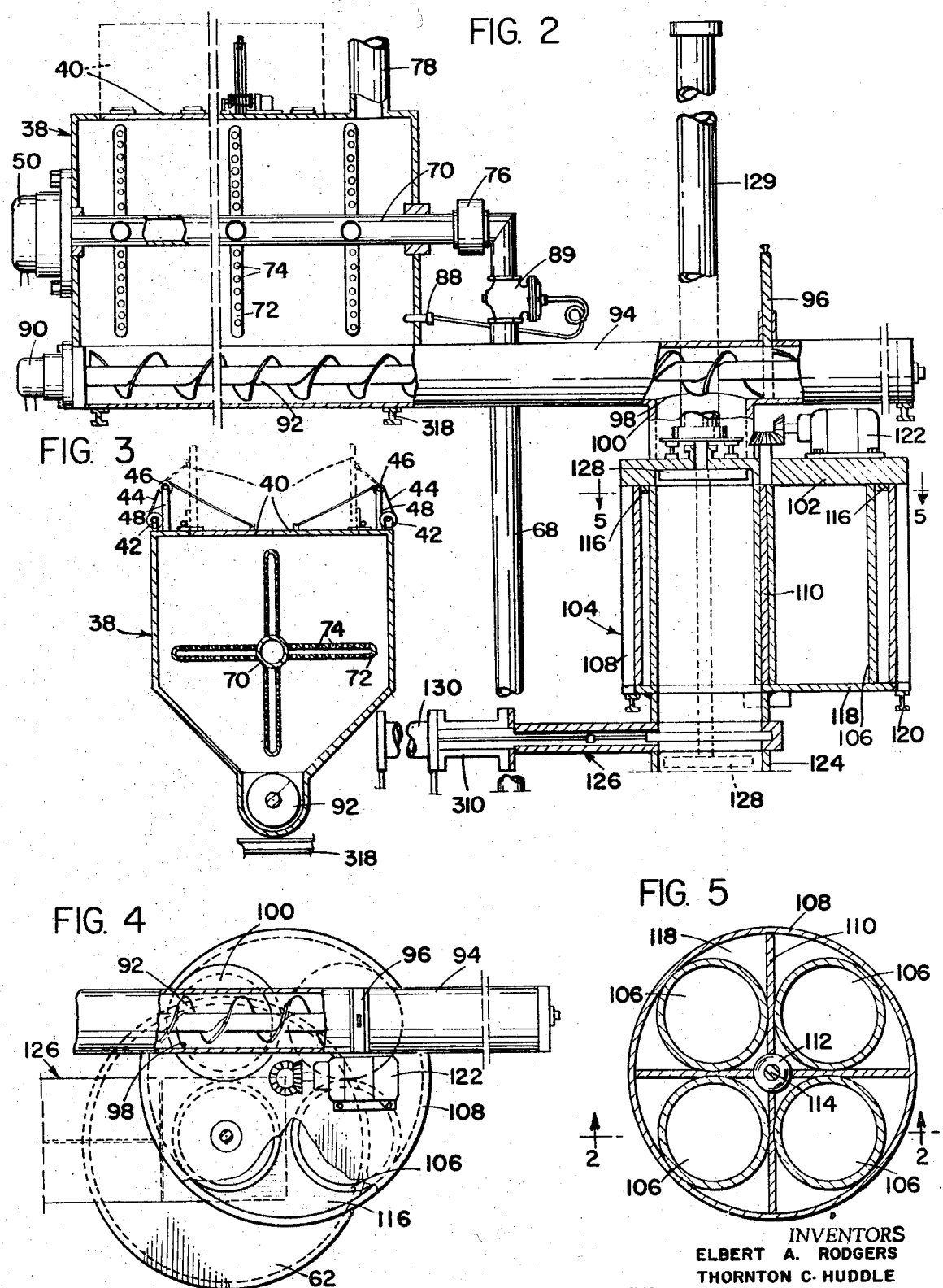

ELBERT A. RODGERS
THORNTON C. HUDDLE
KENT B. KNOX
INVENTORS

BY *Wayland D. Keith*
AGENT

INVENTORS
ELBERT A. RODGERS
THORNTON C. HUDDLE
KENT B. KNOX
BY Wayland D. Keith
AGENT INVENTORS
ELBERT A. RODGERS
THORNTON C. HUDDLE
KENT B. KNOX
BY Wayland D Keith
AGENT

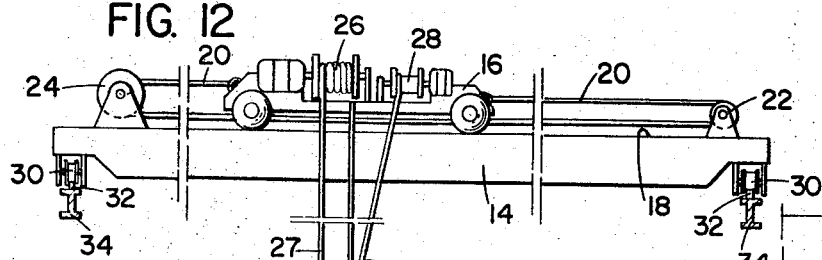
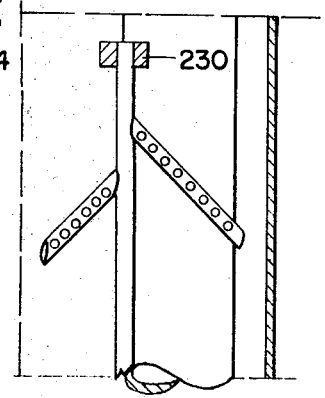
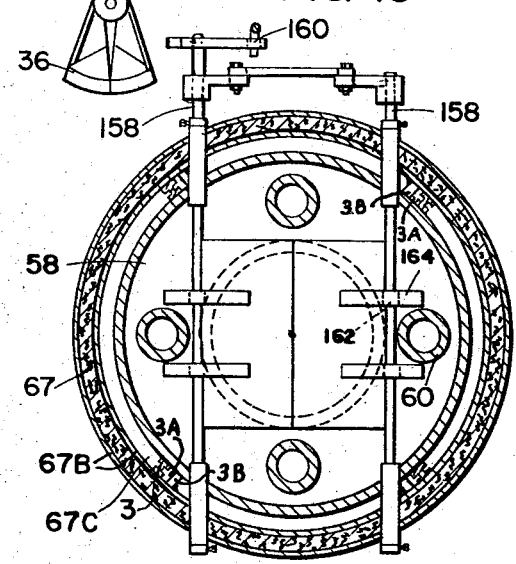
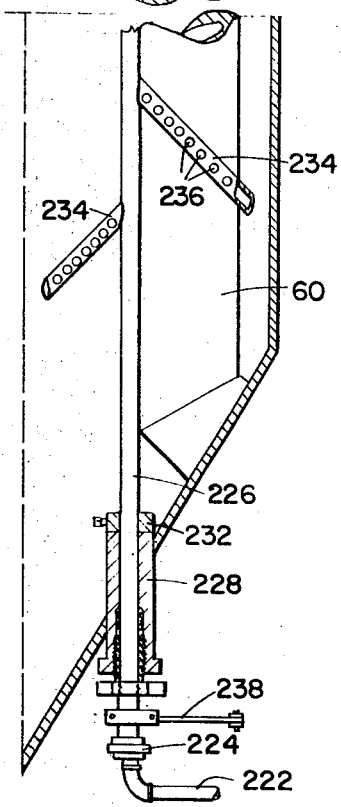
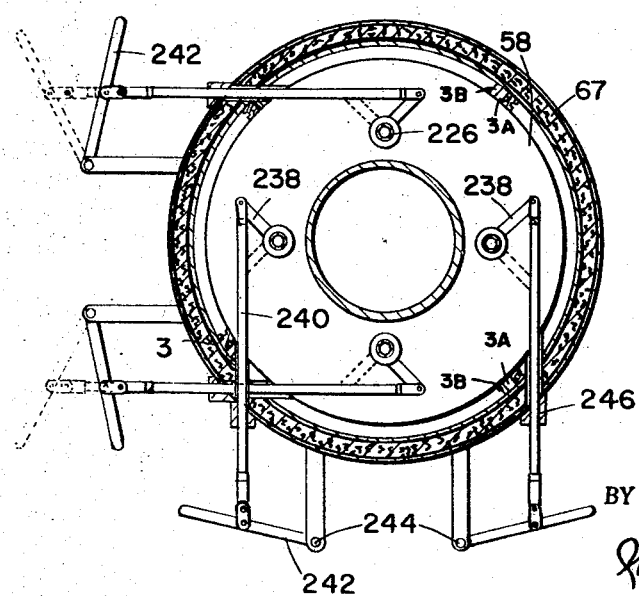
ELBERT A. RODGERS
THORNTON C. HUDDLE
KENT B. KNOX
INVENTORS
BY
*Wayland D. Keith*
AGENT

ELBERT A. RODGERS
THORNTON C. HUDDLE
KENT B. KNOX
INVENTORS

BY

*Wayland D. Keith*
AGENT

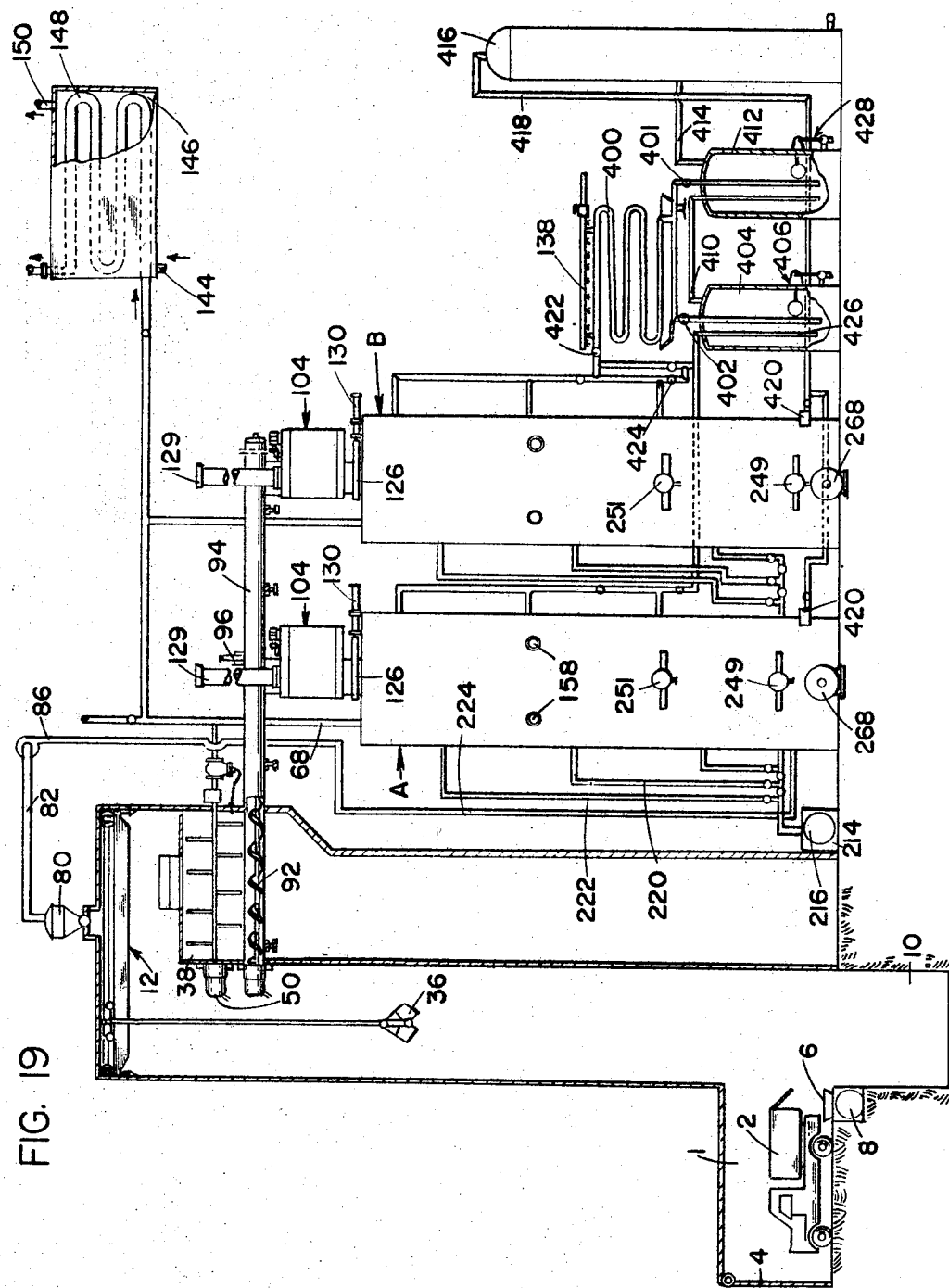

3,554,143

METHOD OF AND APPARATUS FOR THERMOLYTIC DESTRUCTIVE DISTILLATION OF CARBONACEOUS MATERIALS, INCLUDING THE RECOVERY OF CERTAIN PRODUCTS THEREFROM

This invention relates to improvements on U.S. Pat. No. 3,362,887, to Elbert A. Rodgers, APPARATUS FOR AND METHOD OF REDUCING REFUSE, GARBAGE AND THE LIKE TO USABLE CONSTITUENTS, issued Jan. 9, 1968.

This invention relates to a method of and apparatus for thermolytic destructive distillation of carbonaceous material, particularly to the destruction of refuse, garbage and waste material as gathered by the sanitation departments of cities.

The present method of and apparatus for thermolytic, destructive distillation of such refuse and garbage includes the reduction of combustible materials substantially to ash, with the noncombustible materials passing therethrough not affecting the efficiency of operation of the system.

The present system has a primary aim, the reduction of refuse and garbage to a minimum in bulk, without the release of pollutants into the air and the recovery of valuable products from the material being processed, in the form of tars, acids, and other materials which can be subsequently refined, if desired, and normally with sufficient gas to make the system self sustaining, once it is in operation and in certain instances, create additional gas suitable for domestic or factory use.

The present refuse and garbage disposal system utilizes a completely closed system from the time the refuse, garbage, and the like is dumped into a shredder and storage bin until the residual ash and solids are removed, and the usable constituents recovered.

Various incinerators and garbage disposal systems have been proposed heretofore, but many of these are designed to perform one function, however, sometimes in so doing, other conditions were created which are undesirable, such as wasting valuable fuel, the waste of byproducts and releasing undesirable pollutants into the air.

In the disposal of refuse, garbage and waste material some cities utilize "land fills" wherein the putrescible material and other waste material is dumped in huge earthen ditches until almost full. Then a layer of soil, usually several feet thick, is used to cover the putrescible material and refuse. This system is usually considered less expensive, except for land cost, than some of the other systems of disposing of garbage and refuse, however, this system leaves the surface of the land unfit for normal commercial use as there always exists the probability of spontaneous combustion, emission of noxious, odoriferous gases, and water seepage, which is always a possible source of contamination of streams, lakes, and water strata.

Incineration is another system widely used and if amount of burnable material in the refuse and garbage is sufficient to thoroughly burn the material without auxiliary fuel, the cost may be low, however, an incinerator plant usually produces pollution from two sources; first, the dust from putrescible the collection vehicles and the odor generated from the decomposed putrecible matter in the storage pits, and second, and most important, is the pollution potential of the stack effluent with its emissions of particulates, fumes, noxious, odoriferous gases and unburned hydrocarbons.

The present system is designed to correct many of the deficiencies found in the disposal of garbage and refuse in the past by utilizing a thermolytic destructive distillation by controlled combustion in a closed system, which enables the utilization of the combustion heat to dehydrate the putrescible matter, green foliage and the like, as the material is processed therethrough, with the combustion the so controlled both exteriorly and interiorly of the chambers as to get maximum recovery of byproducts from the material in a minimum of time and to reduce to ash burnable constituents in a minimum of time, and also utilizing the heat produced by the combustion substantially to the fullest extent, not only to process the material passing therethrough, but to furnish heat for generating steam by heating water in heat exchange relation so that a minimum of hot flue gases are emitted from the furnace chambers as stack effluent. A minimum of odors discharged from the treating chambers in the form of odoriferous gases are directed into the firebox of the furnace so that the intense heat thereof nullifies the odors.

The present system is so designed that the odors and the flying particulate that would otherwise be airborne from the unloading of the trucks is maintained in a closed facility to prevent contamination of the air. Further the closed facility eliminates stench and disagreeable odors that usually emanate from large stock piles of unprocessed offal or refuse.

The present arrangement enables the refuse to be handled by a crane or conveyor so the material can be processed and dehydrated in heat exchange relation so that the minimum amount of fuel is required to reduce to ash, the greatest amount of refuse in the shortest time, with recovery of valuable constituents in the form of tars, acids, oils, greases and particles which normally are discharged into the air as fly ash, with a considerable amount of the gas being produced being of a grade comparable to commercial manufactured gas.

The present arrangement enables a multiplicity of vessels to be positioned one above another to be heated simultaneously from the same source of heat, which vessels are communicable and isolable, thereby enabling the material to be processed progressively in batches substantially continuously after the initial starting of the process, which system enables the loading of the vessels, charring, burning and unloading the ash from the lowermost vessel, with the units being kept at or near the maximum operating temperature, which enables the processing of a maximum quantity of refuse and garbage in a minimum of time with a minimum of fuel, with a unit which is of relatively small capacity for the amount of refuse and garbage which it will handle.

An object of this invention is to provide a destructive distillation system for garbage and refuse material, which is a closed system.

Another object of the invention is to provide a refuse and garbage destructive distillation system which will substantially eliminate the odors from the gases resulting from putrescent material by burning these gases.

A further object of the invention is to provide a destructive distillation system for refuse and garbage which has provision for heat exchange relation between the incoming refuse and garbage with that being processed to enable the processing of garbage in greater amounts in a minimum of time with a minimum amount of fuel.

Still a further object of the invention is to provide a system for reducing organic material to ash for use as a soil conditioner.

Yet another object of the invention is to provide a system which produces a greater portion of gas than is used in the destructive distillation, which gas may be used as fuel in the system or, if produced in excess of the requirements of the system may be used for other purposes.

Yet a further object of the invention is to provide a system for processing refuse and garbage wherein valuable constituents, such as acids, tars, oils, greases, fly ash, glass, metallic substances and the like are recovered for use or further refining.

Still another object of the invention is to provide a closed destructive distillation system, which does not give off obnoxious odors, which system may therefore be operated in populated areas, thereby reducing the travel time in collecting and hauling the garbage and refuse to the facility for disposal.

A further object of the invention is to provide a destructive distillation system which may be built in suitable units, which may be used in conjunction with a primary unit to enable the output of material processed to be increased without materially increasing the cost of the process.

Yet another object of the invention is to provide a destructive distillation system for refuse and garbage which utilizes a minimum of ground space on which to install the plant for processing refuse and garbage in a substantially continuous batch process.

Still a further object of the invention is to provide a destructive distillation system involving a multiplicity of chambers, which chambers are communicable and isolable for continuous batch processing, with the gases which emanate therefrom being taken through heat exchangers and scrubbers to cleanse certain of the gases for use as fuel in the process, or if in excess of the amount required as fuel, to be put to other uses.

Still another object of the invention is to provide for combustion of refuse and garbage, the gases which emanate from such refuse and garbage, in the raw state, are controlled and therefore odors from the process are eliminated.

Yet another object of the invention is to provide for capturing and controlling oderiferous gases and air pollutants in the effluent from material being processed to avoid contamination of the atmosphere.

A further object of the invention is to provide for the reduction of raw garbage by about 90percent by volume.

Another object of the invention is to provide for automatic control of the vapors and condensed liquids by thermostatic and pressure actuated controls.

Still another object of the invention is to provide heat control transfer of heat energy through the walls of the compartments to enable volatile and organic materials to be driven off to the condensers and scrubbers without comingling combustion gases with the refuse and garbage being processed.

With these objects in mind and others which will become apparent as the description proceeds, reference is to be had to the accompanying drawings in which like reference characters designate like parts in the several views thereof, in which:

FIG. 1 is a diagrammatic elevational view of one form of the invention, showing portions as being broken away, and portions being shown in section to bring out the details of construction;

FIG. 2 is a fragmentary, enlarged elevational view, partly in section, of the garbage and refuse-receiving and heat-treating chamber, with parts being broken away, with parts shortened and with parts being shown in dashed outline, showing a conveyor associated therewith connected to a rotary proportional loader for the drying chamber, and showing a closure gate below the rotary proportional loader;

FIG. 3 is a sectional view taken on the line 3–3 of FIG. 2, looking in the direction indicated by the arrows, and showing an alternate position of the garbage and refuse-receiving chamber with an open position of the closure doors in dashed outline;

FIG. 4 is a fragmentary, top plan view, with parts being broken away and with parts being shown in section, of the rotary proportional loader, as shown in FIG. 2;

FIG. 5 is a sectional view taken on the line 5–5 of FIG. 2, looking in the direction indicated by the arrows of the rotary proportional loader;

FIG. 12 is an enlarged, fragmentary elevational view, with parts broken away and with parts shortened, to illustrate a longitudinal and transversely movable crane system, and showing a clamshell bucket suspended therefrom;

FIG. 13 is a sectional view taken on the line 13–13 of FIG. 8 looking in the direction indicated by the arrows;

FIG. 14 is a sectional view taken on the line 14–14 of FIG. 8, looking in the direction indicated by the arrows;

FIG. 15 is an enlarged, fragmentary elevational view of one of the agitators and gas dispensers used in the compartment shown in FIG. 8, with parts being shown in section and with parts broken away to bring out the details of construction;

Figure 17:
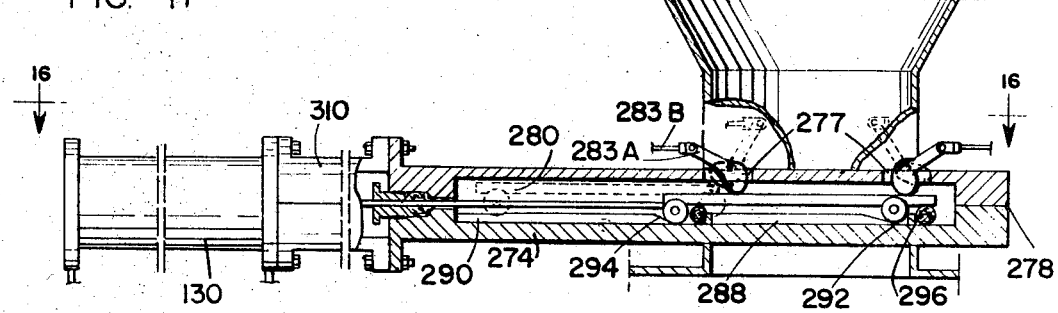
FIG. 17 is an enlarged, vertical sectional view through one of the gates between the compartments.
Figure 18:
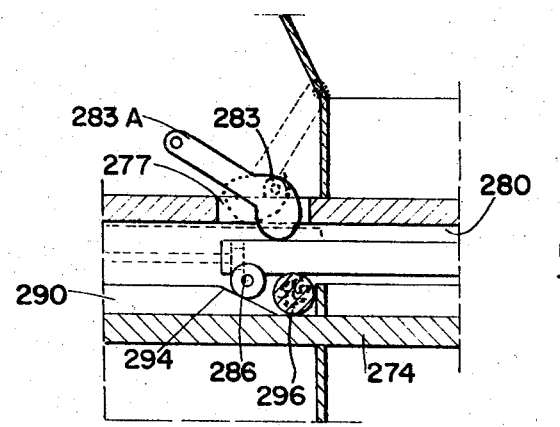

FIG. 18 is an enlarged fragmentary view of a portion of the gate as shown in FIG. 17, showing the details of construction and the sealing arrangement; and FIG. 19 is a diagrammatic view of a modified form of the invention, which utilizes a plurality of destructive distillation units, and showing a simplified condenser system for the vapors, the internal mechanism being of the same construction as for the first form of the invention.

With more detailed reference to the drawing, the numeral 1 designates generally an enclosed refuse and garbage-unloading compartment in which vehicle 2 may be positioned therein and a closure door 4 closed so as to be substantially in dust-tight relation therewith, with the vehicle 2 discharging the refuse and garbage into a shredder or hammer-mill-type disintegrator 6 which is driven by a motor 8. The shredded refuse and garbage may be directed into a pit or bin 10 which is accessible to an overhead crane system, designated generally at 12, which system has transversely movable beams 14, and a longitudinally movable carriage, designated generally at 16, on a trackway 18, as will best be seen in FIG. 12. The longitudinal movable carriage 16 has a tow cable attached to one end construction, end of which passes around an idler sheave 22 and onto a winch 24, with one reach of the cable being wound thereunder and the other reach of the cable is wound off the opposite side of the 36. The winch 28 has a cable 29 wound thereon and controls the opening and closing of the clamshell buchet 36, as is well 24 and connected to the opposite end of carriage 16, so upon rotation of winch 24 in one direction, the carriage 16, having motor-driven winches 26 and 28 mounted thereon, will be moved longitudinally along the trackway 18 on beams 14, in one direction, and upon rotation of the winch 24 in the opposite direction, the carriage 16 will be moved in the opposite direction, the purpose of which will be more fully brought out hereinafter.

The beams 14 are mounted on wheels 30 which roll on rails 32 on structural member 34 in a manner well known in the art of cranes.

For simplification, the motor drives to winch 24 and wheels 30 have not been shown, as these are considered conventional construction, well known in the art of cranes, and winches. A winch 26 has a cable 27 wound thereon and controls the raising and lowering of the clamshell bucket 36, as is well known in the art of clamshell buckets.

The clam shell bucket 36 may be lowered into a pit or stock pile of refuse and garbage by remote control and raised, together with a load of refuse and garbage, and moved to a point above a loading bin, designated generally at 38, which bin has doors 40 hingeable mounted thereon. The doors 40 are raised and lowered by winches 42 which are motor operated, which winches each have a cable 44 passing over a sheave 46 mounted on an upright standard 48, so as to move the door 40 from closed position, as indicated in full outline in FIGS. 2 and 3, to the upright, open position as indicated in dashed outline in FIGS. 2 and 3, by closing an electrical circuit remote therefrom. With the doors 40 open, as shown in dashed outline in FIGS. 2 and 3, the refuse and garbage may be dumped into the loading bin 38 and with the motor 50 running, the material will be agitated, and the heat and products of combustion being generated in furnace chamber 52 will pass upward around a burner tank or chamber 54 and through flues 56 and thence upward around carbonization chamber or tank 58 and through flues 60, thence upward around drying chamber or tank 62 and out into an open space 66 above drying chamber 62, and below insulation jacket 67.

A portion of the heat and products of combustion is directed into vent stack 68 which leads to a hollow shaft 70, of an agitator 71 in loading bin 38. Arms 72 on hollow shaft 70 are tubular and are closed at the distal ends thereof with the ends adjacent the hollow shaft 70 being connected in fluid communication therewith. The arms 72 are perforated as indicated at 74, and as will best be seen in FIG. 2, so as the heated gases pass out of open space 66 into a vent stack 66, through a rotary fluid seal 76 into hollow shaft 70, the hot gases will be discharged out through perforations 74 into the refuse and garbage being agitated by agitator arms 72 within loading bin 38. The rotation of the shaft 70 will continue until the refuse and garbage therein has been heated to the desired temperature, below the boiling point, which will dry the refuse and garbage, with the odoriferous gases therefrom passing out through vent pipe 78 into a centrifuge 80 to which a suction conduit 82 is connected which withdraws the odoriferous gases therefrom into suction fan 84, which is motor driven, and directs these gases into discharge pipe 86, which pipe discharges the odoriferous gases into the furnace chamber 52, the heat of which furnace is such as to nullify the odor of these gases.

When the refuse and garbage within loading bin 38 has been agitated by an agitator 71 in a heated condition a sufficient length of time at proper temperature to drive off the desired amount of moisture and raise the temperature is thermostatically controlled by a heat-sensing thermocouple 88 sensing the temperature in loading bin 38, which thermocouple is connected to thermostatically actuated valve 89. The conveyor motor 90 is started which will rotate the screw conveyor 92 to direct the heated refuse and garbage from the loading bin 38 through conveyor tube 94 and with the stop gate 96 thereof closed, the refuse and garbage will be directed through an opening 98 in the lower side of conveyor tube 94 into a tubular member 100 which connects the conveyor tube 94 with a cover 102 of a rotary proportional loader, designated generally by the numeral 104.

In the present instance, the rotary proportional loader is shown to have four receiving chambers 106, which chambers are surrounded by a cylindrical member 108, which member is internally braced by radial walls 110, which walls connect with a hub 112 to which the shaft 114 is secured. The area 116 between each receiving chamber 106 and the cylindrical member 108 is covered with plates to prevent refuse passing down between the outside of the receiving chambers 106 and the inside of the cylindrical member 108.

The lower end of cylindrical member 108 is closed by a stationary plate 118 which is mounted on and supported by structural members 120. The cylindrical member 108 is secured to and is rotatable with shaft 114. The cover 102 and the lower plate 118 are stationary.

When the conveyor 92 has discharged sufficient material to fill one of the receiving chambers 106 into which the material is being discharged, the motor 122 is energized which will rotate the cylindrical member 108 in the direction indicated by the arrow in FIG. 5. When the receiving chamber 106, which has been filled with refuse and garbage, is rotated to a position above the cylindrical inlet neck 124, the neck 100 will connect the loaded receiving chamber 106 in communication with an opening 125 in the upper end of drying tank 62. Upon opening a gate, designated generally by the numeral 126, the refuse and garbage is discharged out of the loaded receiving chamber 106 thereabove. Should the refuse and garbage be tightly packed within receiving chamber 106, a ram 128 in fluid cylinder 129 is actuated by a suitable source of fluid pressure (not shown) and the ram may be moved from the position as shown in full outline in FIG. 2, to that shown in dashed outline therein, which will insure the material being discharged below gate 126.

Depending upon the capacity of the drying chamber or tank 62, several loads of refuse and garbage from the receiving chamber 106 may have to be discharged into the drying chamber or tank 62 to sufficiently load the chamber for processing. Whereupon, the gate 126 is closed by a fluid actuated cylinder and plunger arrangement 130, as will best be seen in FIG. 2. With the drying chamber or tank 62 being closed at the upper end by gate 126 and at the lower end by closure doors 132 so as to produce a fluidtight seal at both the gate and the closure doors and with the heat from furnace 52 being directed upward therearound, the refuse and garbage within the drying chamber or tank 62 is heated to a suitable temperature to dry the material in the most expeditious manner.

Figure 1:
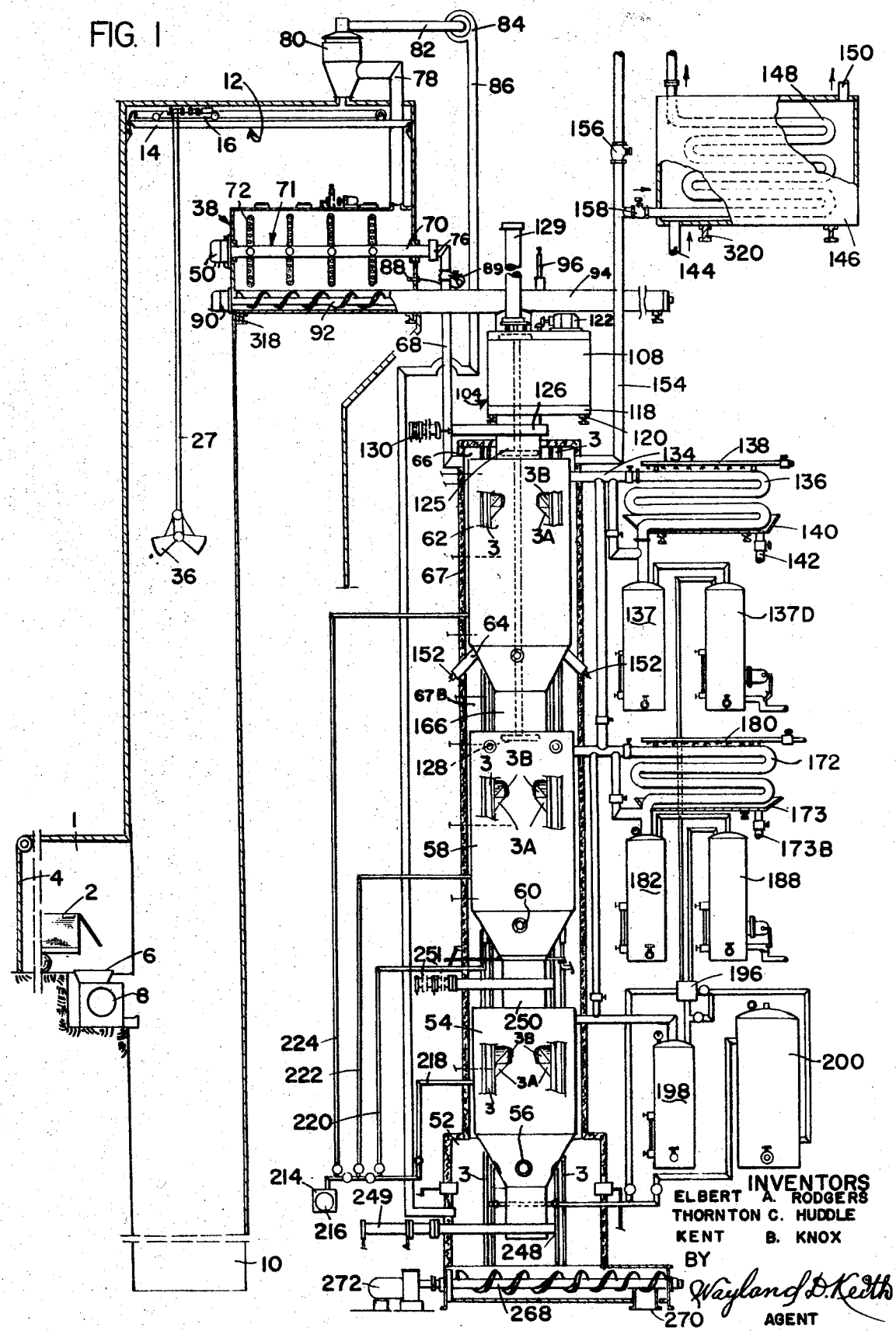
Figure 10:
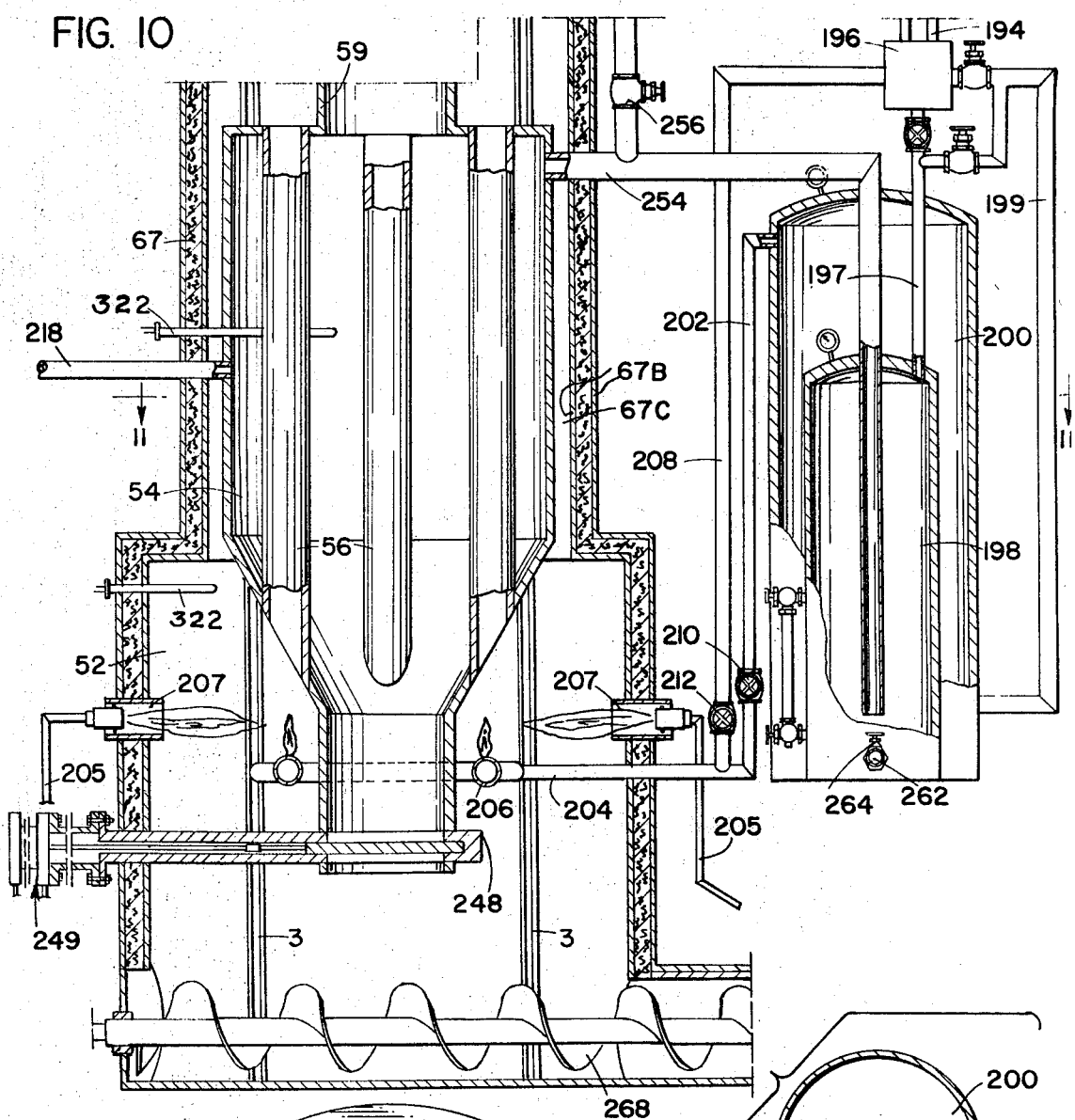
FIG. 10 is a longitudinal sectional view through the third compartment or burning chamber, with parts being shown in elevation and with parts broken away, and showing condenser and supply tanks associated therewith.
Figure 11:
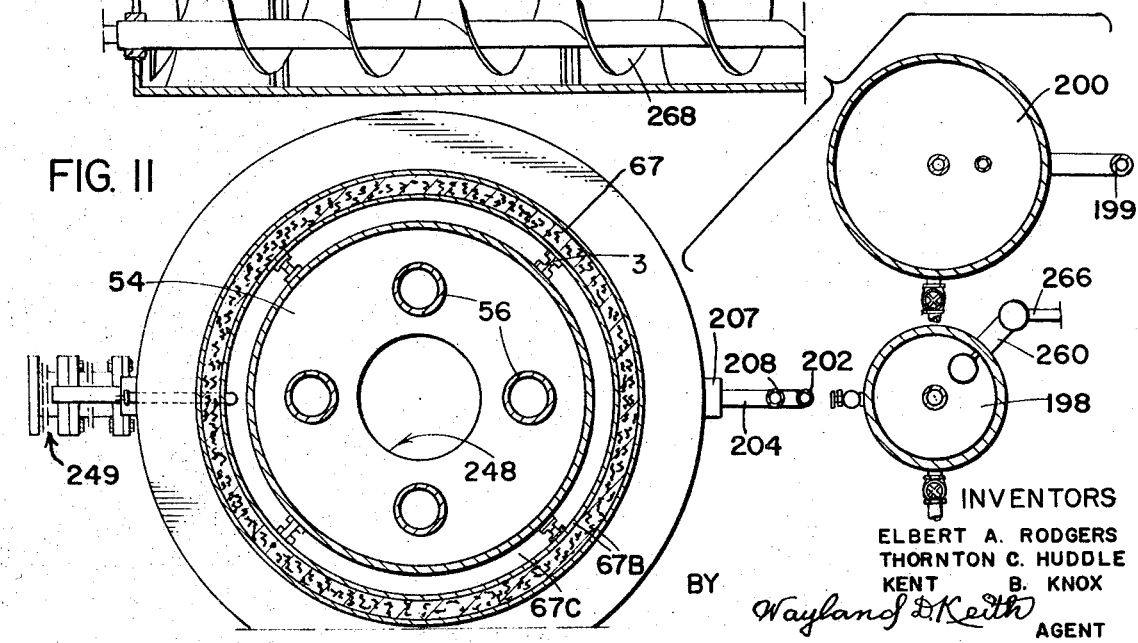
FIG. 11 is a sectional view taken on the line 11–11 of FIG. 10, looking in the direction indicated by the arrows.

With the valve 135 open and valves 135A and 178 closed, the gas condensate from condenser coil 136 will be directed into scrubber 137 which has a float valve control arrangement 137A thereon to discharge the condensate therefrom into a pipe 137B which leads to storage, with the gas passing out through pipe 137C into a condenser 137D, the liquid level of which is also controlled by a float controlled valve 137E which discharges the condensate therefrom into pipe 137F to storage. The scrubbed gas is directed out through pipe 137G to manifold pump 196, as shown in FIGS. 1 and 10, which gas is then directed to storage, as desired. The odoriferous vapors therefrom will pass out through vapor outlet pipe 134, into heat exchange condenser coils 136 which are cooled by water being sprayed from pipe 138 onto coils 136, which water being sprayed from pipe 138 is received within drip pan 140 at an elevated temperature. The water may be directed outward from pipe 142 to enable the water which has become heated by the hot gases in the condenser coil 136 to be used, as desired. The water from drip pan 140 may be directed into a conduit 144 into a closed heat exchange cooling tank 146 to cool gases passing through coil 148, which in turn, will super heat the water so water at an elevated temperature, or steam, may be taken from pipe 150 for such use as might be desired.

While the refuse and garbage is being heated in drying chamber or tank 62, additional heat may be supplied by gas burners 152 positioned within the lower end of flues 64, which burners will accelerate the drying of refuse and garbage in tank 62 and, at the same time, present additional heat for passing up through vent stack 68 and with thermovalve 89 open, the heated products of combustion will be discharged into the hollow shaft 70, in the manner hereinbefore set out, however, any excess products of combustion and stack effluent, which is too great for the vent stack 68 to handle, will be diverted into stack 154 leading from open space 66 and into heat exchange coils 148 so that the heated products of combustion will be cooled to a substantially normal temperature before passing to atmosphere. Should it be necessary or desirable to release a portion or all of the products of combustion from stack 154, valve 156 may be opened and valve 158 may be closed, or these may be throttled to pass the amount of stack effluent to produce complete combustion of the fuel and the complete destructive distillation of the refuse and garbage in a manner which will be more fully brought out hereinafter.

Figure 8:
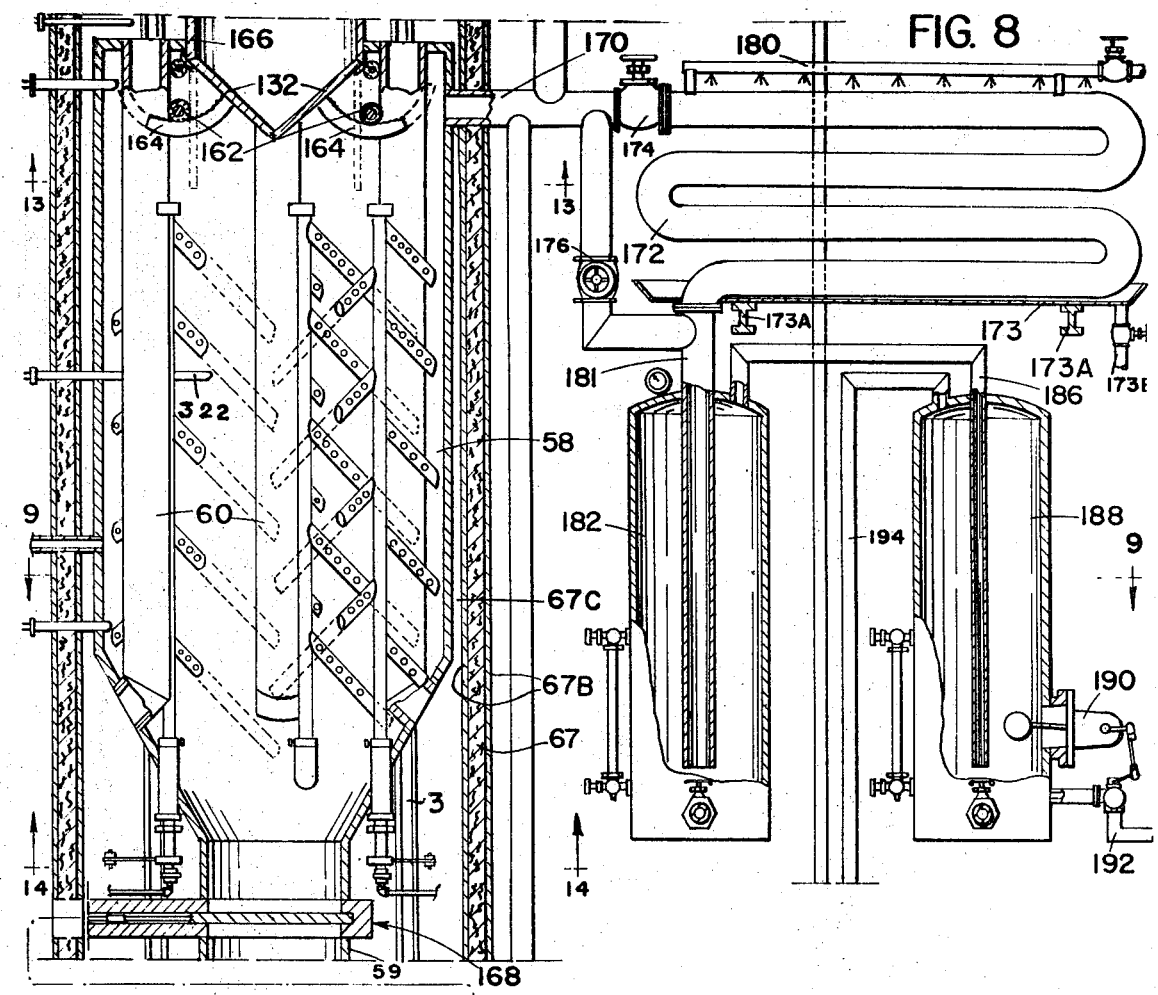
FIG. 8 is a longitudinal sectional view taken through the second compartment or carbonizing chamber, showing a condenser coil and scrubber tanks associated therewith, with portions being shown in elevation, and with portions being broken away.

Simultaneously, with the treatment of refuse and garbage in drying chamber 62, additional garbage has been directed into the loading bin 38 in the manner afore set out, so as to have the temperature of the material raised sufficiently to dehydrate the refuse and garbage to the proper extent. The refuse and garbage is then directed onto the conveyor 92, which refuse and garbage is discharged through opening 98 within neck 100 into the receiving chamber 106 below the conveyor 92, and when the temperature in drying chamber 62 has been raised to the correct temperature for processing the refuse and garbage therein, the doors 132 are opened by turning the arcuately movable shafts 158 and lever 160, which in turn, will move gears 162 in mesh with arcuate racks 164, which racks are secured to doors 132, which will move the doors 132 from the position, as shown in full outline in FIG. 8, to that shown in dashed outline therein. However, due to the heating of refuse and garbage in drying chamber 62, it is possible that the refuse and garbage may become clogged therein, whereupon the ram 128 is moved from the position as shown in full outline in FIG. 2 to the extreme lowermost position thereof, as shown in dotted outline in FIG. 1, which will move the dried refuse and garbage into carbonizing chamber or tank 58. Whereupon, the pivoted doors 132 between chambers 62 and 58 are closed in substantially vaportight relation against the bottom of angulated neck 166, as will best be seen in FIG. 8, with refuse and garbage in the carbonizing chamber or tank 58 and with a gate, generally designated by the numeral 168, closed and with pivoted doors 132 closed, the refuse and garbage therein is heated at a temperature of 900° to 1.200°, with the heat that passes thereby and through the flues 60 upward through and around drying tank 62, however, as the material is now being heated in the closed chamber 58, gases will emanate from this material and will be discharged out through pipe 170 and through condenser coil 172, if valve 174 is open and valves 176 and 178 are closed.

The condensate from heat exchange coil 172, which is being cooled by water sprayed from pipe 180, will be directed into a receiver tank 182, the fluid level of which is controlled by a float valve arrangement 184, with the bath of liquid therein being held at a sufficient level to perform a scrubbing action on the gas, which scrubbed gas will pass out of pipe 186 into a condenser tank 188, whereby the gas flowing thereinto is condensed and is further scrubbed, with the liquid in condenser tank 188 being maintained at a suitable level by float valve arrangement 190 to direct the condensate out through pipe 192 to a suitable storage facility. The scrubbed gas will then be directed out of the top of condenser tank 188 into pipe 194, thence into the manifold of a suction pump or compressor 196, FIG. 10.

Upon the cooling water or the like passing out of spray pipe 180 and over coils 172, the water is caught in a water-receiving or drip pan 173, which pan is supported on structural beams 173A with a pipe 173B leading from the water-receiving pan 173, which water, together with water from pipe 142 may be directed into closed condenser tank 146 through pipe 144, if desired, so as to enable a high recovery of heat energy generated within furnace 52.

The pump 196 is so connected to a manifold that the gas therefrom may either be directed through pipe 197 into a scrubber 198, or through pipe 199, into a gas storage tank 200. Pipe 202 leads from the gas storage tank 200 to a fuel supply line 204 which leads to burners 206 within the furnace 52, however, a pipe 208 may lead from the manifold pump 196, with valve 210 closed and valve 212 open, to burn the gas produced in the system by burners 206 before the final scrubbing. Various valving and pipe arrangements for switching the gas to various pipes are shown to enable the use of the manufactured gas in various stages of purification.

For initial heating of the system gas or other fuel, from an outside source is used by directing the fuel through pipes 205 to burners 207, which may serve as a standby fuel system after the system is generating all or part of the fuel requirements for the system.

Figure 9:
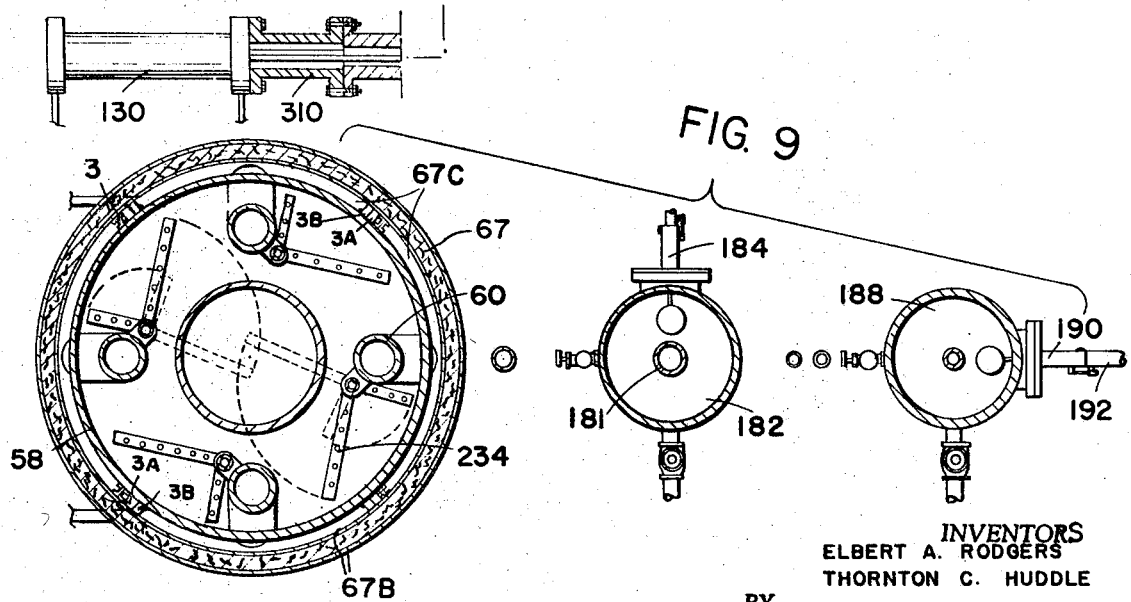
FIG. 9 is a sectional view taken on the line 9–9 of FIG. 8, looking in the direction indicated by the arrows.

While the heat is being applied to drying chamber or tank 62 and to carbonizing tank 58 or to burning chamber or tank 54, air, under pressure, may be directed from air compressor 214, driven by motor 216, into air pipes 218, 220, 222 and 224 in the required amount. The air pipe 218 leads into burning tank to produce a complete combustion o of refuse and garbage therein, as will be more fully described hereinafter. The pipes 222 lead through rotary fluid seal 224 into arcuately movable tubular members 226 which passes through stuffing boxes 228 into the interior of carbonizing chamber or tank 58, with the air passing upward through each of the respective arcuately movable tubular members which are journaled in the respective stuffing boxes 228 and bearings 230 secured to the sides of the respective flues 60 therein. Each of the tubular members 226 is held against downward movement by an abutment, such as a set collar 232. The upper end of each tubular member 226 is closed. A plurality of outwardly extending arms 234 are secured to tubular member 226 and which arms are in fluid communication therewith. The outer ends of the arms 234 are closed and the arms are perforated, as indicated at 236, to emit air outward therefrom. A lever 238 is secured to each of the tubes, which lever extends outwardly and is connected to a linkage 240, which in turn, is pivotally connected to an operator lever 242. The lever 242 is pivotally connected to an apertured lug 244. The linkage 240 passes through a stuffing box 246 which retains the vapors within the carbonizing tank 58, yet permits arcuate movement of tubular member 226 to move the arms 234 through approximately 90°, as will best be seen in full outline and in dashed outline in FIG. 9, which arms are so positioned as to dislodge any material which may be adhering to the walls of the carbonizing tank 68 and to direct air into the area in which the arms are arcuately movable.

In addition to the arms dislodging carbonized refuse and garbage from the walls and the flues of the carbonizing tank 58, the air discharged under pressure serves to cool the arms and the shaft and to furnish diluent for the gas from the garbage and to provide oxygen therein to make the gas more combustible. Simultaneously, air may be admitted into carbonizing tank 58 through air pipe 222.

When the refuse and garbage has been processed the desired length of time and at the desired temperature in tank 58 and with the burning tank 54 empty, and the gate, designated generally at 248, is closed, and the gate, designated generally by the numeral 250, is opened, which will permit the carbonized refuse and garbage in tank 58 to be discharged into burning tank 54, whereupon, gate 250 is closed, so as to present a gastight tank for the final destructive thermolytic distillation of the refuse and garbage, and the reduction thereof to ash and solids, after the recovery of gas therefrom. With the heat being directed from burners 206 and/or 207 into furnace 52, the temperature within burning tank or chamber 54 is elevated to a temperature of from 900° to 1,200°, and which temperature is sensed by thermocouple sensor 252, the refuse and garbage is maintained at this temperature, and with the valve 256 closed, with the gas from the chamber 54 being driven out through pipe 254 into scrubber 198.

The condensate level of which scrubber is controlled by a float valve arrangement 260 to scrub the gas passing therethrough, which gas is drawn off through pipe 197 into the manifold pump 196 in the manner hereinbefore set out for use in firing the furnace 52. The condensate may be directed out either through pipe 262 by manual manipulation of valve 264 or automatically directed through pipe 266, by the float valve arrangement 260, to a place of storage, by the pressure, within the scrubber 198. The carbonizing tank 58 is preferably of less capacity than the drying tank 62, as the material being processed becomes less in volume. Furthermore, the burning tank 54 is of less capacity than the carbonizing tank 58, so that, once the cycle of batching has been started, upon emptying burning tank 54 by opening gate 248, the ash and residual solids of h the refuse and garbage is directed onto conveyor 268 to discharge out through discharge opening 270. The conveyor 268, in the present instance, is a screw-type conveyor which is driven by a gear reduction motor 272. The gates 248 and 250 are opened and closed by fluid actuated cylinders 249 and 251 respectively, in a manner well known in the art of fluid actuated cylinders.

A plurality of structural members, such as H-beams 3, are arranged in parallel, vertical relation, which have outstanding support brackets 3A secured thereto at spaced intervals therealong. The burning tank 54 has complementary arranged support brackets 3B secured thereto to engage support brackets 3A to support the tank 54 in suspended thereon a spaced distance upward from the lower end thereof, which suspension allows movement, due to expansion and contraction. A second tank 58, which is a carbonization tank, has complementary arranged brackets 3B secured thereto, which tank is mounted axially above the tank 54 and is connected in fluid communication therewith by a neck 59. The brackets 3B of the tank 58 engage brackets 3A secured to H-beams 3 to suspend the tank in like manner. The third tank 62, which is a drying tank, has complementary arranged brackets 3B secured thereto, which tank is positioned z axially above the tank 58 and is suspended in a manner similar to tank 54, by brackets 3B engaging brackets 3A, secured to H-beams 3. A neck 166 interconnects the tank 58 and the tank 62 in fluid communication for the passage of refuse and garbage therethrough.

The rotary proportional loader 104 is mounted above the drying tank 62 and is connected in fluid communication therewith by a neck 125, which rotary proportional loader is supported on structural beams 316. The loading bin 38 and conveyor tube 94 are supported on structural beams 318, and the cooling tank 146 is supported on beams 320.

While beams have not been shown as supporting scrubber tanks 137, 182 and 198, condenser tanks 137D, 188, and storage tank 200, it is to be understood that the scrubber tanks, the condenser tanks and the storage tank are supported on beams or other suitable support means applicable to the installation being made.

An insulation jacket 67 is coaxial with tanks 54, 58 and 62, and is spaced outward therefrom and has a cover 67A of insulation material thereover to form a vaportight jacket. Vent stacks 68 and 154 lead out from the open space 66 between the upper end of drying tank 62 and the lower face of cover 67A. It is preferable to have the insulation jacket 67 covered on the interior and exterior by cylindrical retaining covers 67B of metal which is heat resistant, such as stainless steel, or the like. By using H-beams to support the tanks 54, 58 and 62 in suspended, axially aligned relation, this forms passages 67C between the outside diameter of the respective tanks and the inside diameter of the insulation jacket 67 for the passage of the products of combustion upward from furnace 52.

Figure 6:
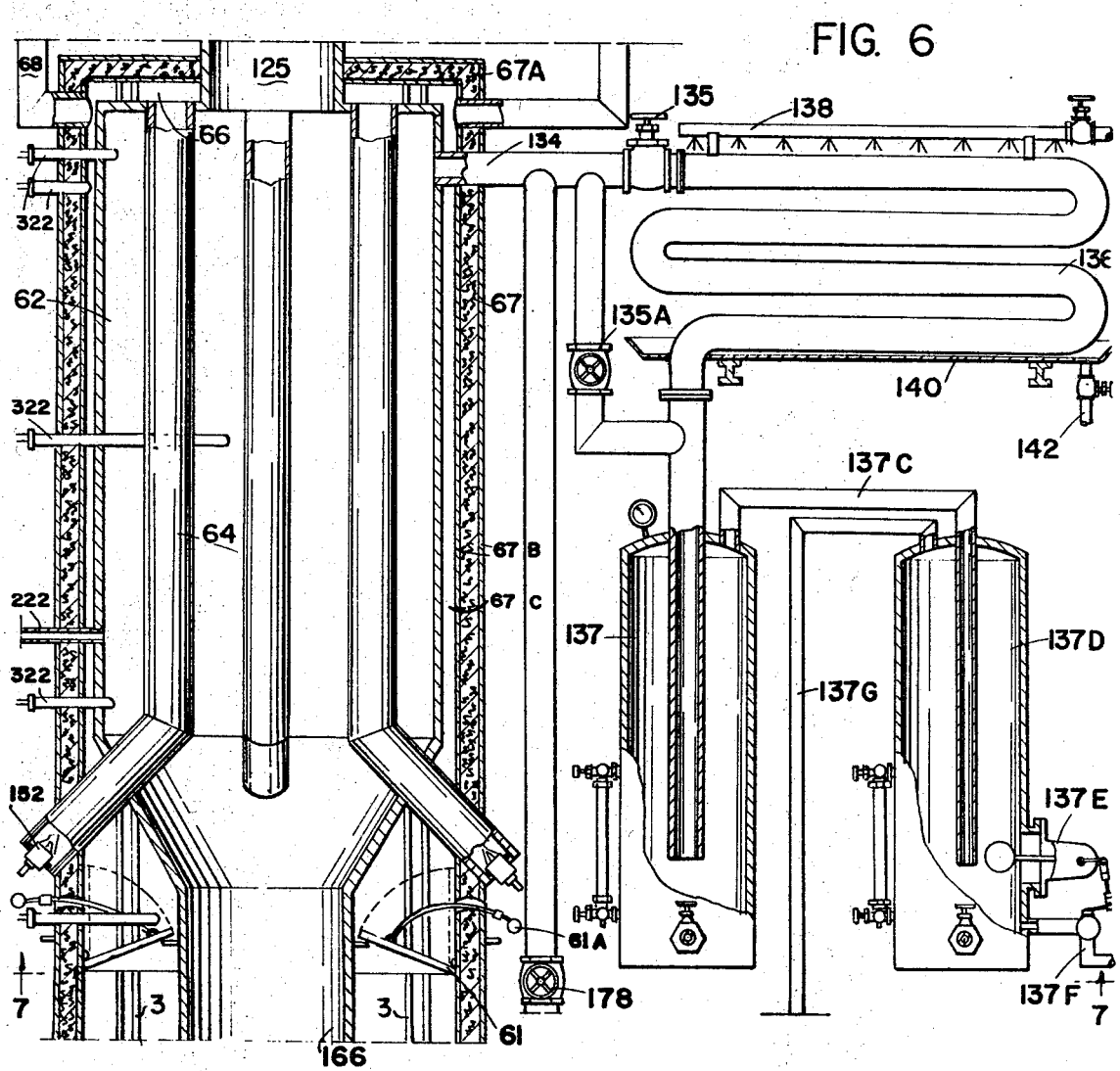
FIG. 6 is a longitudinal sectional view, with parts being shown in elevation, and with parts broken away, of the uppermost garbage and refuse-receiving compartment or drying chamber for initially drying the refuse and showing the condenser coils and scrubbers associated therewith.
Figure 7:
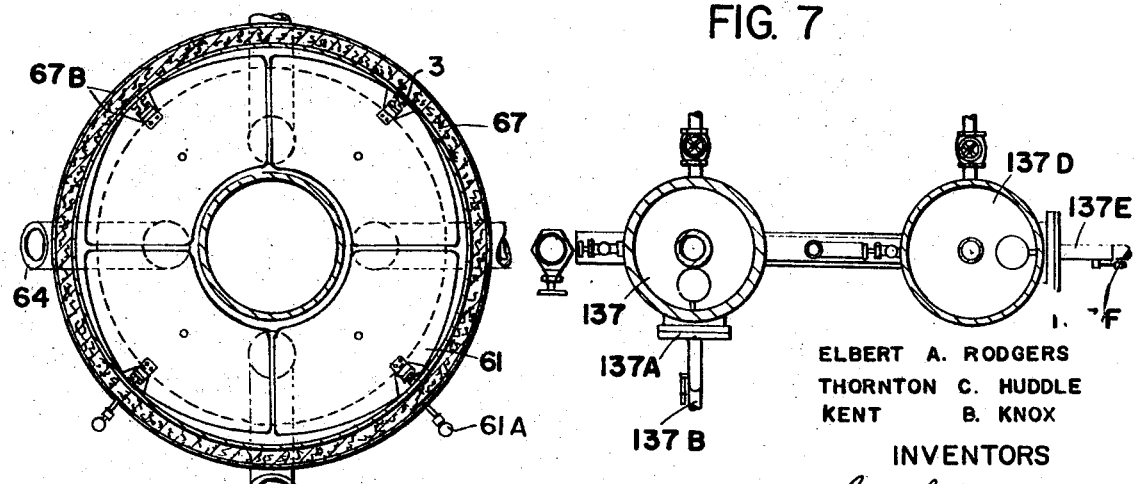
FIG. 7 is a sectional view taken on the line 7–7 of FIG. 6, looking in the direction indicated by the arrows.

Draft control dampers 61 are positioned intermediate the jacket 67 and the neck 166 to surround the neck in substantially draft retarding relation, when in one position, and which dampers may be moved to the desired position, by regulating means, such as chains 61A attached thereto, to another position, as the dampers may be moved from the position as indicated in full outline in FIGS. 6 and 7 to substantially the dashed outline position, as shown in FIG. 6.

It is preferable to have thermocouples, indicated generally at 322, spaced throughout the length of the insulation jacket and extending therethrough which enclose the tanks 54, 58 and 62 with certain of the thermocouples sensing the heat of the products of combustion passing upward through spaces 67C. Other thermocouples extend to just within the respective tanks, and still other of the thermocouples extend deeply into the tanks, so the conditions of the heating of the refuse and garbage, as well as of the flue gasses, can be determined at all times.

It is to be pointed out that, by raising the temperature of the refuse and garbage to 900° to 1,200°, the combustible material will be reduced to ash and vapors, which vapors are condensed and the condensate trapped. The solids which are not burnable, are discharged with the ash onto the conveyor 268, and by reburning the odoriferous gases in the furnace, at these temperatures, the odor in nullified or substantially so, so that the stack effluent may be discharged out through vent stacks 68 and 154.

By maintaining the heat within the range as set out above and not permitting the heat to be raised to a point that will melt metals and generate noxious gases, will minimize pollutant gases and particulate discharged to the atmosphere.

Figure 16:
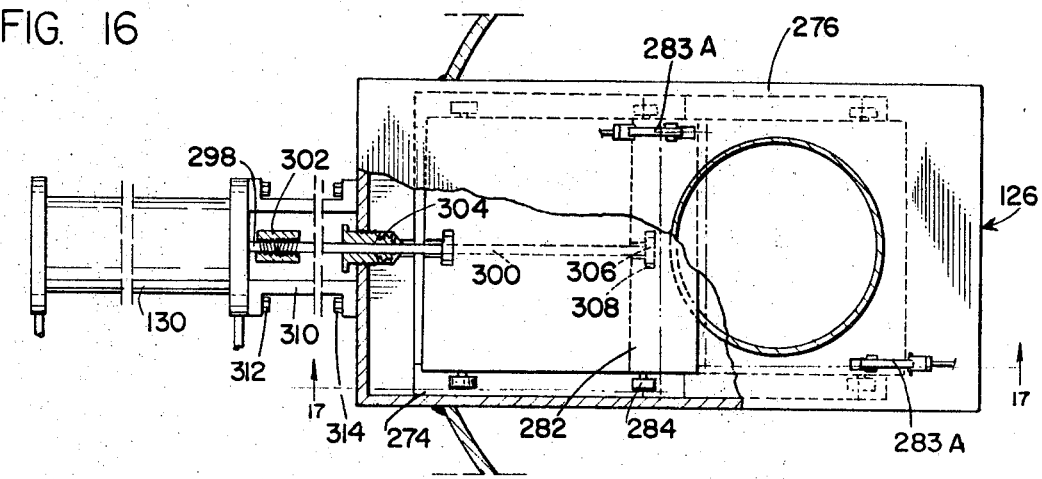
FIG. 16 is a sectional view taken on the line 16–16 of FIG. 17, looking in the direction indicated by the arrows.

A detail of a gate 126, 168 or 248 is shown in FIGS. 16 through 18, wherein the rectangular lower body portion 274 and the upper body portion 276 are joined together, as by welding, as indicated at 278. A recess 280 is formed between body portions 274 and 276 to receive a slide gate 282, which is rectangular in form and has two rollers 284 journaled on each side thereof on axles 286. The axles 286 are secured to the rectangular gate 282. Tracks 288 and 290 are positioned on opposed, longitudinal sides of the recess 280 and are secured to the lower rectangular body portion 274 and each of the tracks 280 and 290 have wedge-shaped ends 292 and 294 remote from cylinder 130. The tracks 288 and 290 are spaced apart longitudinally so when the rollers 288 are in one position, they will be resting on the upper face of the lower body portion 274, with the lower face of the slide gate 282 being in contact sealing relation with the upper face of gasket 296.

Clamping means, which is cams 283, which cams are pivotally mounted on the upper body portion 276 and each cam extends through the respective openings 277 in the upper face of body portion 276, and engages the upper face of gate 282 in approximately diametrically opposed relation. When the levers 283A are in the position as shown in full outline in FIGS. 17 and 18, the cams 283 are engaged, and are in a disengaged position when the levers are in the position as shown in dashed outline therein. A control rod 283B is pivotally connected to lever 283A and extends outward through asbestos insulation jacket 67 and has a control actuator handle 283C thereon, to enable the cams 283 to engage the slide gate 282 to loosen loosen and tighten the gate from a position outside the heat area. While only two cams have been shown, additional cams may be installed to engage at more than two places, if desired. While the cams are shown to be metal-to-metal engagement, a spring may be arranged between each pivot point and the respective cam so as to present a yielding feature, if it is desired to spring load the cams.

Upon movement of the gate 282 toward cylinder 130, after cams 283 have been loosened, rollers 292 and 294 roll upward on the respective wedge-shaped ends 292 and 294 of tracks 288 and 290 to lift the slide gate 282 upwardly out of engagement with annular sealing gasket 296, to prevent damage to the gasket.

The slide gate 282 may be moved from the position as shown in FIG. 16 to that shown in dashed outline therein to close the gate. The plunger 298 of hydraulic cylinder 130 is connected to a rod 300 by a threaded coupling 302, which is preferably of the right- and left-hand-type connection. The rod 300 passes through a stuffing box 304 and has an enlarged head 306 interengaging a T-slot arrangement 308, in such manner that, as the slide gate 282 is moved to different elevations, the head 306 will slide vertically within the T-slot so the rod 300 may move axially through stuffing box 304.

The fluid actuated cylinder 130 is secured to a longitudinally divided adapter 310, which adapter is bolted to the cylinder 130 by bolts 312 and which adapter is bolted to the end of the body portions 274 and 276 by bolts 314.

By removing the bolts 312 and 314 from the adapter, the adapter may be removed laterally to give access to the coupling 302 to enable the packing of the stuffing box 304 or to make possible the servicing of the hydraulically actuated cylinder 130. While the above description has been specific to the gate, designated generally at 126, it is to be understood that this applies equally to gates 168 and 248, which are identical in construction to gate 126.

MODIFIED FORM OF THE INVENTION

The device, as shown in FIG. 19, is a modified form of the invention, in as much as it uses a plurality of thermolytic destructive distillation units, which are so arranged as to enable a single source of refuse and garbage collection equipment to be utilized to supply a plurality of thermolytic destructive distillation units, which units are structurally the same as the aforementioned unit and may be connected with a multiplicity of scrubbers, condenser tanks and gas storage tanks, in the same manner as the aforementioned form of the invention. The units, if desired, may be connected to a simplified scrubber and condenser tank and gas storage tank, without separating the distillates in accordance with the stages from where they are removed from the refuse and garbage thermolytic destructive distillation units.

The same numbers, in so far as applicable, will apply to the present form of the invention as were used in the aforementioned form of the invention, and the description of the specific details will be used only as required in describing the present form of the invention.

After the refuse and garbage is dumped by truck 2 into the pit 10, the clamshell bucket 36 of the crane system 12 will direct the refuse and garbage into loading bin 38, whereupon it is directed onto screw conveyor 92. With conveyor gate 96 closed, the garbage and refuse, which has been agitated and heat treated in bin loader 38, is directed through opening 98 of the conveyor housing into one of the receiving chambers 106 of the rotary proportional loader 104, to be directed into the thermolytic destructive distillation unit, designated generally at A, in the same manner as the aforementioned form of the invention. When the drying tank 62, which is the uppermost tank, has been filled with heated garbage and refuse the gate 96 in conveyor 92 is opened, and with the receiving chamber below opening 98 becoming filled, the refuse and garbage will be moved by conveyor 92 within conveyor tube 94 and discharged into the rotary proportional loader 104 of thermolytic destructive distillation unit, designated generally at B. While the garbage is being dried within drying chamber 62 of unit A, the drying chamber 62 in unit B may be filled with refuse and garbage which has been agitated and heated in the bin loader 38. While only two thermolytic destructive distillation units have been shown in FIG. 19, the conveyor tube 94 and conveyor 92 may extend to additional units so as to accommodate a capacity volume of the unloading and heat-processing facilities, as shown at 10, 36 and 38, respectively.

The refuse and garbage processes through the thermolytic destructive distillation units A and B progressively in the same manner as the aforementioned form of the invention and in the same processing steps as the aforementioned form of the invention. However, in the form of the invention as shown in FIG. 19, the valving and the vapor discharge line is such that the vapors being emitted from all three chambers 62, 58 and 54 may be directed through a single condenser coil 400 and with valve 401 closed and valve 402 open, the vapor and condensate is directed into scrubber tank 404, with the condensate remaining in the tank to be discharged by a float valve arrangement 406, under controlled pressure. The vapor of the scrubbed gas passes out through pipe 410 into condenser tank 412 and with the gas condensed, the vapor will pass out of the top thereof into gas line 414 to gas storage tank 416. A gasline 418 leads from gas storage tank 416 to gas burners 420. When the complete cycle of thermolytic destructive distillation in unit A has been completed by the refuse and garbage progressing through tanks 62, 58 and 54 and treated in the manner afore set out, the ash and solids are directed from burning tank 54 into conveyor 268, which ash and solids may be salvaged or otherwise disposed of in accordance with their value.

The thermolytic destructive distillation units A and B may be so timed that as unit A is discharging ash and solids, unit B may be processing refuse and garbage, and vice versa. In this manner, a maximum efficiency for using the personnel may be had.

If it is desired to bypass the condenser coils 400, valve 422 may be closed and valves 424 may be opened, which arrangement will direct the gas or vapor directly in through pipe 426 into scribber 404 with the gas being scribbed therein, with the residual liquid or condensate passing out through float valve arrangement 406 and the gas passing out through pipe 410 into condenser tank 412 to further scrub and condense the gas with the scrubbed gas passing out through pipe 414 into storage tank 416 for use and with the condensate in condenser 412 being directed out through float valve arrangement 428 under pressure.

Various valves are provided into the air lines leading into the various chambers 54, 58 and 62 to provide proper oxygen for mixing with the gas and also provide proper oxygen in the burning tank 54 to reduce the combustible material in the tank to ash in the quickest possible time by controlled combustion.

Various valves are provided in the gaslines intermediate the various tanks 54, 58 and 62, the scrubbers, the storage tank, and the burners to properly control the vapors for condensation and for burning in the furnace 52.

The various fluid lines to the cylinders to actuate the slide gates are well known in the art and have not been shown, nor have the controls for the various electric motors, as these are well known in the art of electric motors, and the disclosure is not being burdened by these controls.

It is to be pointed out that the present system is so designed as to be a closed system with a controlled combustion for destruction to ash of combustible materials fed into the system and utilizing heat transfers through the walls of the compartments and flues and directing stack effluent gases through the material to obtain a maximum of heat exchange with a pollutant release to atmosphere reduced to a minimum without creating nitrous oxides or other noxious elements to be discharged into the atmosphere. The system used in both cooling an adsorptive bath systems for cleansing vapors and the burning of the noxious vapors in such manner that the odoriferous gases are substantially nullified. It is also to be further pointed out that the unloading area is maintained at a slight negative pressure by suction fan 84 to prevent the escape of odors and flying particulates with the air. The particulate-laden air is directed through the centrifuge 80 to cleanse the air of the particulate. The odor withdrawn by the fan is directed through exhaust pipe 86 into the furnace 52 to nullify the odors by the elevated temperatures therein.

We claim:

1. A method of reduction of combustible refuse and garbage to ash by thermolytic destructive distillation in a closed system, comprising the steps of:
   a. supplying a source of refuse and garbage;
   b. providing a load-receiving bin;
   c. directing the garbage into the load-receiving bin;
   d. supplying a source of heat;
   e. agitating the refuse and garbage in the load-receiving bin while heat is being applied thereto;
   f. providing a plurality of refuse and garbage-receiving chambers, one above the other, which chambers are selectively isolable or communicable;
   g. one of the plurality of refuse and garbage-receiving chambers being a drying chamber;
      1. supplying heated refuse and garbage to the drying chamber;
      2. closing the drying chamber to retain the refuse and garbage therein;
      3. providing a vapor outlet for directing vapor outward from the drying chamber;
   h. forming an insulation jacket to surround and cover the chambers and being a spaced distance outward therefrom for passage of heat upwardly between the chambers and the insulation jacket;
      1. supplying a vent stack to connect with the passage between the insulation jacket and one of the chambers:
   i. further heating the refuse and garbage in the drying chamber by conduction from the source of heat passing upwardly thereby;
   j. directing the garbage and refuse from the drying chamber into a carbonization chamber;
      1. closing the carbonization chamber to retain the refuse and garbage therein;
      2. providing a vapor outlet for directing vapor outward from the carbonization chamber;
   k. supplying heat to the carbonization chamber to carbonize the refuse and garbage therein;
   l. directing the carbonized refuse and garbage into a burning chamber;
      1. closing the burning chamber to retain the refuse and garbage therein;
      2. providing a vapor outlet for directing vapor outward from the burning chamber; and 3. discharging ash of the combustible refuse and garbage from the burning chamber.

2. A method of reduction of combustible refuse and garbage to ash by thermolytic destructive distillation in a closed system, as defined in claim 1; and including supplying the drying chamber with additional heat from a second source.

3. A method of reduction of combustible refuse and garbage to ash by thermolytic destructive distillation in a closed system, as defined in claim 2; and including the steps of:
   a. providing flues in the drying chamber; and
   b. creating combustion within the flues of the drying chamber to supply the additional heat to the drying chamber.

4. A method of reduction of combustible refuse and garbage to ash by thermolytic destructive distillation in a closed system as defined in claim 1; and including the vapor from the chambers is directed to a burner in the furnace to provide fuel for combustion to supply the source of heat.

5. A method of reduction of combustible refuse and garbage to ash by thermolytic destructive distillation in a closed system as defined in claim 4; and including directing the products of combustion upward in conduction relation around the burning chamber, the carbonization chamber and drying chamber.

6. A method of reduction of combustible refuse and garbage to ash by thermolytic destructive distillation in a closed system as defined in claim 1; and including the additional step of introducing air under pressure into the burning chamber of a closed system to supply oxygen in a metered amount to maintain controlled combustion at a predetermined heat for a predetermined length of time.

7. A method of reduction of combustible refuse and garbage to ash by thermolytic destructive distillation in a closed system, as defined in claim 1; and including the additional steps of:
   a. providing a condenser which connects with the vapor outlet of at least one of the chambers;
   b. providing a scrubber for directing odoriferous vapor and condensate thereinto;
   c. providing a further condenser;
   d. directing the vapor from the scrubber into the further condenser;
      1. condensing a portion of the vapors directed into the further condenser; and
      2. directing vapor therefrom into a furnace for burning and to nullify at least some of the odors of the odoriferous vapor.

8. A method of reduction of combustible refuse and garbage to ash by thermolytic destructive distillation in a closed system, as defined in claim 7; and including the additional steps of:
   a. providing a heat exchange tank;
      1. supplying the heat exchange tank with a piping system;
      2. supplying a source of water to the heat exchange tank to pass around the piping system in heat exchange relation;
   b. connecting the vent stack in fluid communication with the piping system in the heat exchange tank so as to condense the vapor passing therethrough; and
   c. directing heated water from the condenser tank.

9. An apparatus for reduction of combustible refuse and garbage to ash by thermolytic destructive distillation in a closed system which apparatus comprises:
   a. a support for upright structural members;
   b. upright structural members mounted on said support;
   c. a plurality of tanks mounted on said structural members and arranged at different elevations, one above another;
      1. said tanks being in fluid communication for passing solids downward therethrough;
      2. closure means intermediate adjacent tanks for selectively isolating material in each tank;
   d. an insulation jacket surrounding and covering the tanks and being a spaced distance outward therefrom to form a passage between said tanks and the insulation jacket;
      1. a vent stack near the upper end of said insulation jacket and being in open communication with the passage between the insulation jacket and one of said tanks;
   e. a loading bin supported near the upper end of the uppermost tank;
      1. said loading bin having an agitator mounted therein;
      2. said power means connected in driving relation with said agitator;
   f. a loader being in communication with the uppermost tank;
      1. a power-driven conveyor extending between said loading bin and said loader for supplying refuse and garbage thereto;
   g. a furnace within said insulation jacket below the lowermost tank and for supplying heat to pass upward through said passage between said tanks and said insulation jacket for simultaneously heating said tanks;
   h. a gas outlet pipe leading from each said tank near the upper end thereof;
   i. a condenser associated with at least one of said gas outlet pipes;
   j. a scrubber tank in fluid communication with said condenser;
      valve means associated with said scrubber tank for directing condensate outward from said tank; and
   k. a further gas outlet pipe leading from the upper portion of said scrubber tank to direct odoriferous gases from said scrubber tank to said burner in said furnace to supply fuel for combustion and to destroy odors of the odoriferous gasses.

10. An apparatus for reduction of combustible refuse and garbage to ash by thermolytic destructive distillation in a closed system, as defined in claim 9; wherein
    a. the uppermost of said tanks has flues passing therethrough, one end of which flues terminates exteriorly of said insulation jacket, the other ends of which flues terminate within the confines of the space between said insulation jacket and said tanks; and
    b. burners associated with each of said flues for producing combustion within the respective flues, to produce dehydration of refuse and garbage within said uppermost tank.

11. An apparatus for reduction of combustible refuse and garbage to ash by thermolytic destructive distillation in a closed system, as defined in claim 9; wherein
    a. a tank is mounted on said upright structural members and is supported thereby below said uppermost tank and forming a carbonization tank;
    b. hollow shafts are journaled within said carbonization tank for arcuate movement;
       1. perforate arms secured to each said hollow shaft and being in fluid communication therewith;
       2. a stuffing box surrounding each said hollow shaft and forming a seal therefor near the lower end of said tank, with said hollow shaft to extend outward therebelow;
       3. operator means associated with each said shaft for moving said shaft arcuately;
    c. a rotary fluid seal on the lower end of said shaft; and
    d. an air conduit connected with said rotary seal of each said hollow shaft for directing air under pressure therethrough and into said carbonizing tank.

12. An apparatus for reduction of combustible refuse and garbage to ash by thermolytic destructive distillation in a closed system; as defined in claim 9; wherein said lowermost tank is a burning tank;
    1. means for directing air under pressure into said burning tank, when closed, in a metered amount to produce controlled combustion of refuse and garbage to reduce said refuse and garbage to ash and vapor in a closed system; and
    2. closure means operable to discharge ash from said burning tank.

13. An apparatus for reduction of combustible refuse and garbage to ash by thermolytic destructive distillation in a closed system as defined in claim 9; wherein said loader, which is in communication with said uppermost tank, is a motor-driven, rotary loader;

1. said loader having a plurality of receptacles to sequentially receive refuse and garbage discharged from said conveyor from said loading bin;
2. said motor-driven rotary loader being adapted to rotate through an arc to sequentially move one of the receptacles thereof from a loading position to the discharge position; and
3. mechanically actuated discharge means to move said refuse and garbage from the receptacle of said loader into the uppermost of said tanks.

14. An apparatus for reduction of combustible refuse and garbage to ash by a thermolytic destructive distillation in a closed system, as defined in claim 9; wherein:
   a. said tanks supported on said structural members comprise three tanks;
      1. the uppermost of said tanks being a drying tank having flues therein, which flues pass through said tank, one of which flues terminate exteriorly of said insulation jacket, the other ends of said flues terminating within the confines of the space between said insulation jacket and said tanks;
      2. burners associated with each of said flues for producing combustion within each of the respective flues, to produce dehydration of refuse and garbage within said drying tank;
   b. a tank mounted below said drying tank for carbonizing refuse and garbage;
      1. hollow shafts journaled within said carbonizing tank for arcuate movement;
      2. perforate arms secured to each said hollow shaft and being in fluid communication therewith;
      3. a stuffing box surrounding each hollow shaft and forming a seal therefor near the lower end of said tank, with the hollow shaft extending outward therebelow;
      4. operator means associated with each said hollow shaft for moving each said shaft arcuately;
   c. a rotary fluid seal on the lower end of said shaft;
   d. an air conduit connected with said rotary fluid seal of each said hollow shaft for directing air under pressure therethrough and into said carbonizing tank;
   e. said lowermost tank being a burning tank;
      1. means for directing air under pressure into said burning tank when said tank is closed, in a metered amount to produce controlled combustion of refuse and garbage to reduce said refuse and garbage to ash and vapor in a closed system;
      2. closure means operable to discharge ash from said burning tank; and
   f. said refuse and garbage adapted to be heat processed in each of said tanks simultaneously by the heat from said furnace and said flues and adapted to be progressively directed through the next lower closure upon introduction of additional refuse and garbage into said drying tank.

15. An apparatus for reduction of combustible refuse and garage to ash by thermolytic destructive distillation in a closed system, as defined in claim 9; wherein:
   a. at least some of said closure members in said tanks are sliding gates comprising;
      1. a hollow gate body having a transverse opening formed therethrough, which opening is adapted to register with an opening in a tank on which said gate is fitted;
      2. a sealing gasket in said gate body and surrounding the transverse opening formed therein;
      3. rollers mounted on opposite longitudinal sides of said gate to support said gate for reciprocating movement;
      4. a track on each longitudinal side of said hollow gate body on which said rollers are adapted to roll;
      5. complementary ends of said tracks being wedge shaped;
      6. a reciprocating operator attached to said gate and extending longitudinally outward through said gate body to move said gate along said track;
      7. said rollers adapted to move off said wedge-shaped ends of said tracks when said gate is in one position, to position said gate in sealing relation with said gasket around said opening; and
   b. clamping means on said elongated hollow body of said gate to move said gate into sealing engagement with said gasket when said clamping means is in one position, and to release said gate for reciprocation thereof within the hollow portion of said gate body when said clamping means is in another position to enable said gate to be moved upwardly and longitudinally away from the opening to permit passage of refuse and garbage through the opening.

16. An apparatus for reduction of combustible refuse and garbage to ash by thermolytic destructive distillation in a closed system as defined in claim 15; wherein said clamping means is a cam.